United States Patent [19]
Kanashiki et al.

[11] 3,977,209
[45] Aug. 31, 1976

[54] REFRIGERATOR CAR

[76] Inventors: Susumu Kanashiki, 170, Fudokoro, Tanuma, Tochigi; Seishi Nakamura, 11-3 Kasuga cho; Hideo Nagai, 3-4-11 Miyahara, both of Utsunomiya, Tochigi, all of Japan

[22] Filed: Dec. 30, 1974

[21] Appl. No.: 537,431

[52] U.S. Cl. ................................ 62/239; 62/323
[51] Int. Cl.² ................. B60H 3/04; F25B 27/00
[58] Field of Search .......................... 62/239, 323

[56] References Cited
UNITED STATES PATENTS

| | | | |
|---|---|---|---|
| 1,982,079 | 11/1934 | Spohr | 62/323 |
| 2,303,857 | 12/1942 | Nuymero | 62/323 |
| 2,323,511 | 7/1943 | Baker | 62/323 |
| 2,338,931 | 1/1944 | Gould | 62/323 |
| 2,532,618 | 12/1950 | Henney | 62/323 |
| 2,541,921 | 2/1951 | Henney | 62/323 |
| 2,660,865 | 12/1953 | Durant | 62/323 |
| 3,218,821 | 11/1965 | Spalt | 62/239 |
| 3,246,592 | 4/1966 | Rath | 62/239 |
| 3,453,839 | 7/1969 | Sabin | 62/239 |
| 3,646,773 | 3/1972 | Falk et al. | 62/323 |

*Primary Examiner*—Lloyd L. King
*Attorney, Agent, or Firm*—Martin A. Farber

[57] ABSTRACT

A refrigerator car includes a freezing container mounted on a chassis, a refrigeration unit mounted on one side of the chassis under the floor of the freezing container, a power unit mounted on the other side of the chassis under the floor, and means for transmitting power from the power unit to the refrigeration unit. The refrigeration unit is communicated with the freezing container for the passing of cooling air.

7 Claims, 10 Drawing Figures

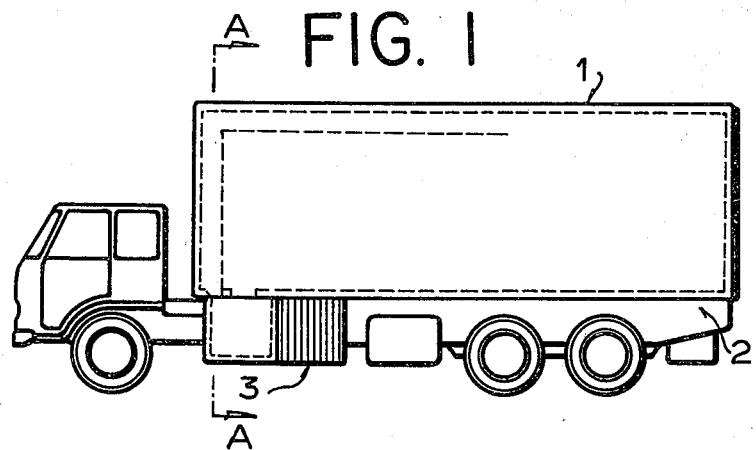
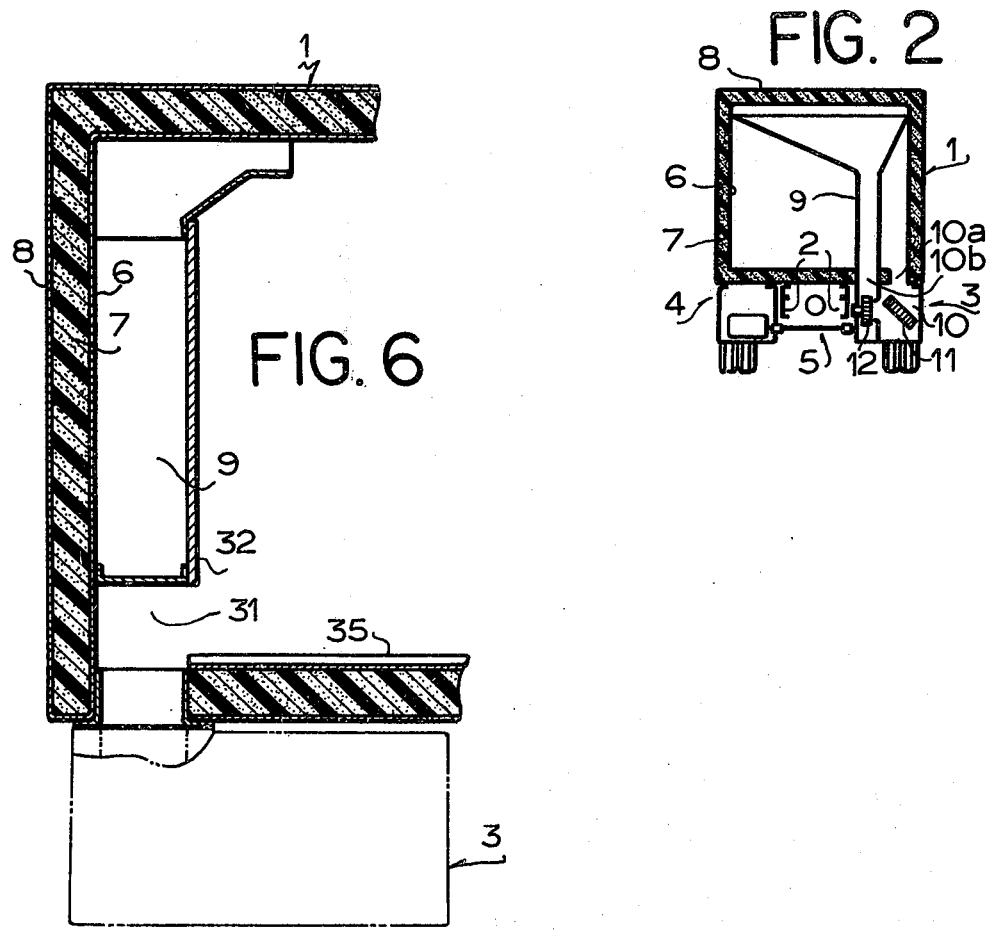

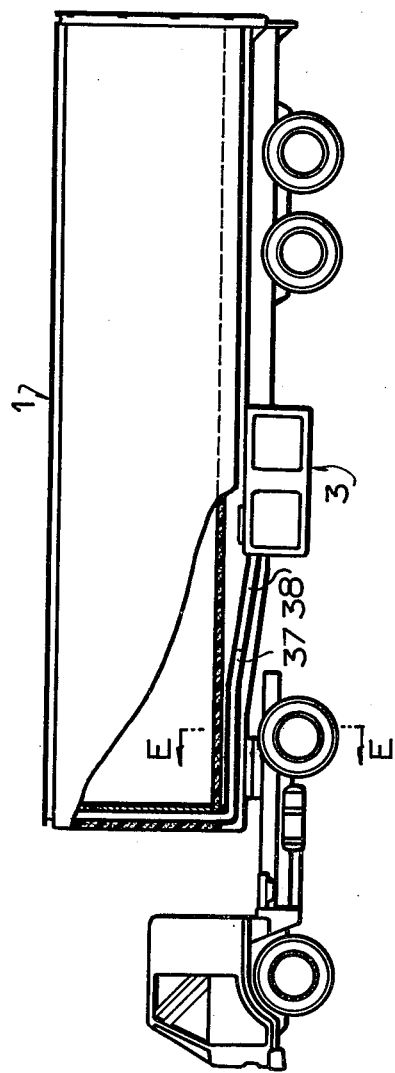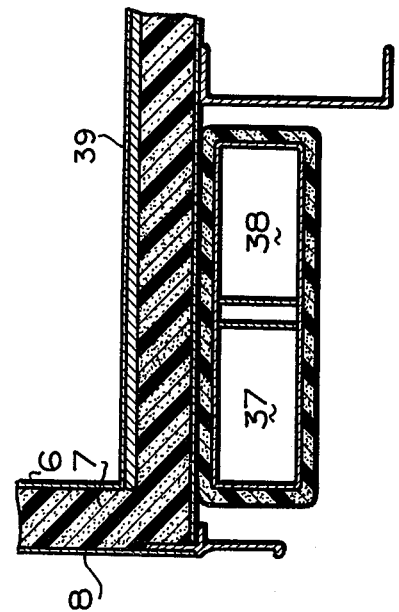

REFRIGERATOR CAR

DETAILED DESCRIPTION OF THE INVENTION

The present invention relates to a refrigerator car, and more particularly to a refrigerator car having a refrigerator disposed on the outside of a freezing container so that the container maintains a maximum load space.

In order to maintain the equilibrium of a car body during running of the vehicle and to prevent the car from turning over, the refrigerator car, which still has a center of gravity apt to transfer to a higher level unavoidably when loaded, should be provided with power and refrigeration units disposed in a position as low as possible.

An object of this invention is to provide a refrigerator car which is an improvement to existing stabilized arrangements by comprising power and refrigeration units mounted under the floor of a freezing container and separated on both sides of a car chassis. The refrigerator car further includes means for transmitting power from the power unit to the refrigerator unit.

In an embodiment, and it is another object of the present invention to so provide, the refrigeration unit includes a cooling air conduit having its inlet communicated with the interior of the freezing container and its outlet communicated with a cooling duct opened near the ceiling of the freezing container, an evaporator and an air-circulating fan both located in the cooling air conduit, so that the air supplied by suction of the fan from the container to the cooling air conduit is heat-exchanged so as to be cooled through the evaporator, and is circulatingly returned, through the cooling duct to the container.

Preferably, and in accordance with another object of the invention, the cooling air conduit extends into an U-shape with its inlet and outlet opened upwardly in a horizontal arrangement. The outlet of the cooling duct may be enlarged to the width of the container, and the container may have a recess so formed at the inner part thereof to induce the air, after freezing materials in the container, into the cooling air conduit.

Separate ducts may be provided communicating with the cooling duct and recess, respectively, which run under the container floor and extend above the refrigeration unit.

With the above and other objects in view, the present invention including the features and advantages of this invention will be understood from the following description with reference to the accompanying drawings as follows:

FIG. 1 is a side view of a refrigerator car embodying the present invention;

FIG. 2 is a cross-sectional front view of the refrigerator car cut off along a line A — A of FIG. 1;

FIG. 6 is a cross-section of the freezing container cut off along a line of C — C of FIG. 4 partly broken away;

FIG. 9 is a side view of a refrigerator car of trailer type modified from the embodiment of FIGS. 7 and 8, partly broken away; and FIG. 10 is a cross-section of a freezing container included in the trailer, cut off along a line E — E of FIG. 9.

Figure 3:
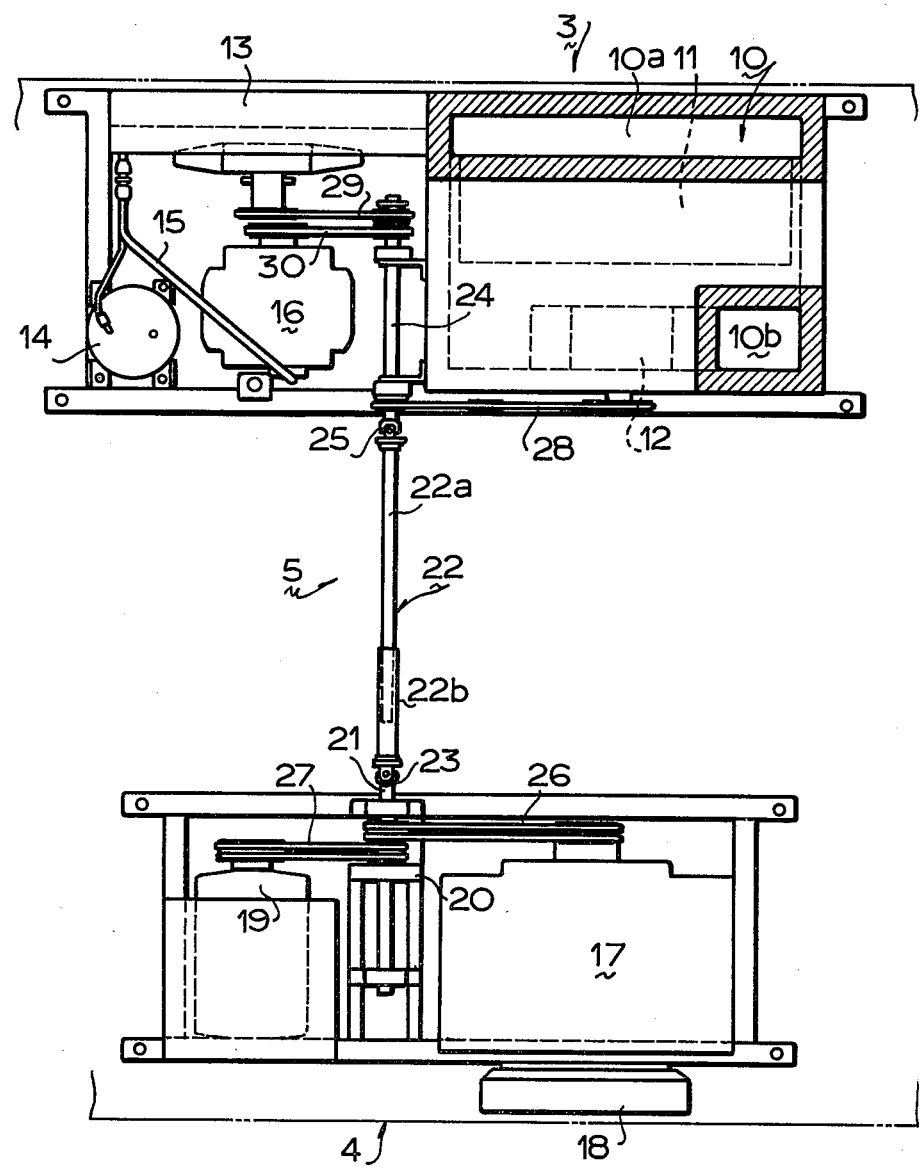
FIG. 3 is a plan view of power and refrigeration units included in the refrigerator car.

Referring to FIGS. 1 to 3, there is provided a refrigerator car which includes a freezing container 1 mounted on a chassis 2, a refrigeration unit 3 mounted on one side of the chassis under the bottom wall defining the floor of the freezing container 1, a power unit 4 mounted on the other side of the chassis under the floor, and means 5 for transmitting power from the power unit 4 to the refrigeration unit 3.

The freezing container 1 is constructed by assembly of a box-shaped housing 6 having a set of doors at its back end, a heat insulator 7 with a thick layer covering around of the housing 6, and a shield cover 8 attached to the outside of the insulator 7, so as to let the material be frozen in the container 1. In this case, the doors are, of course, required to have heat-insulation. The freezing container 1 includes a cooling duct 9 located at the inner part thereof and opening near the ceiling thereof. The cooling duct 9 is preferably enlarged at its outlet with the width of the container.

The refrigeration unit 3 is communicated with the freezing container 1 for the passage of cooling air. Namely, the refrigeration unit 3 includes a cooling air conduit 10 having its inlet 10a communicating with the interior of the freezing container 1 and its outlet 10b communicating with the cooling duct 9 at the bottom wall, an evaporator 11 and an air-circulating fan 12 both located in the cooling air conduit 10, so that the air, after freezing materials in the freezing container, is fed by suction of the fan 12 from the container 1 to the cooling air conduit 10 and so heat-exchanged as to be cooled through the evaporator 11, and is then circulatingly returned through the cooling duct 9 to the container 1. Preferably, the cooling air path 10 extends in an U-shape with its inlet and outlet opened upwardly in a horizontal arrangement.

The refrigeration unit 3 further includes a condensor 13, a refrigerant tank 14 communicating with a line 15, a compressor 16 communicating with the condensor 13 via the line 15, and a fan for cooling the condensor 13 with air, so that a refrigeration circuit is assembled by the compressor 16, condensor 13 and evaporator 11, and in that order the refrigerant is circulated so as to cool the air flowing through the cooling air path 10.

The power unit 4 includes an engine 17 with a radiator 18 and an electric motor 19 both alternatively used, as well as clutches 20 for transmitting power from either the engine 17 or motor 19 to a drive shaft 21 carried on the frame of the power unit 4. Accordingly, when the refrigerator car is running on the road, the compressor 16 may be energized by engine drive via the power transmitting means 5, and when the refrigerator car is at rest, for instance, on the deck of a ferry boat, the compressor 16 may be energized by motor drive to avoid the engine noise and the generation of exhaust gas.

The power transmitting means 5 comprises a propeller shaft 22 connected, by means of an universal coupling 23, to the drive shaft 21, and connected to a driven shaft 24 by means of another universal coupling 25, and a plurality of belt transmission devices 26, 27, 28, 29 and 30. The driven shaft 24 may be rotatably supported on bearings carried on the frame of the refrigeration unit 3. The first transmission device 26 is employed to supply the power from the engine 17 via one of the clutches 20, and the second transmission device 27 to supply the power from the electric motor 19 via the other of the clutches 20. The third transmission device 28 causes the air circulating fan 12 to be rotated and similarly the fourth transmission device 29 causes the condensor fan to be rotated. Finally, the fifth transmission device 30 transmits the power to the compressor 16 so as to cause the latter to be energized.

The propeller shaft 22 may have a telescopical assembly by means of a rod 22a and a tubular member 22b splined to the free end portion of the rod 22a, whereby the length of the propeller shaft 22 together with the universal couplings 23 and 25 may adjust for any misdistance remaining between the power and refrigeration units when their frames are attached to the chassis.

The unit frames are capable of being easily attached to and dismounted from the chassis; for example, they are supported to the chassis only by means of bolt-nuts.

It is found in this embodiment, that the units mounted under the freezing container result in lowering the center of gravity of the car body, thereby causing a full stabilized balance when the refrigerator car is running on the road. Also the separate constructions of the power and refrigeration units are readily available to offer the operator the simplification of assembling, repairing and dismounting.

Figure 5:
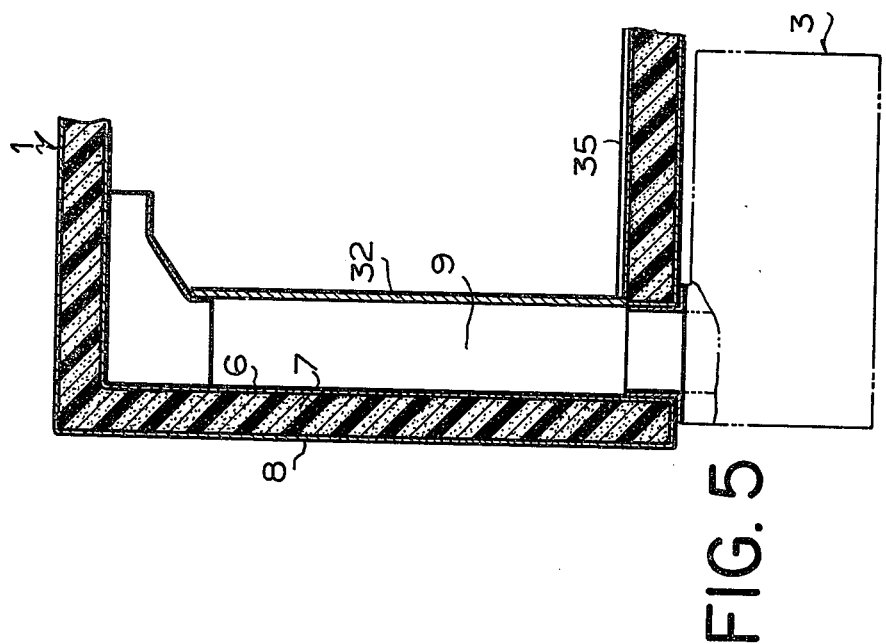
FIG. 5 is a cross-section of the freezing container cut off along a line of B — B of FIG. 4, partly broken away.
Figure 4:
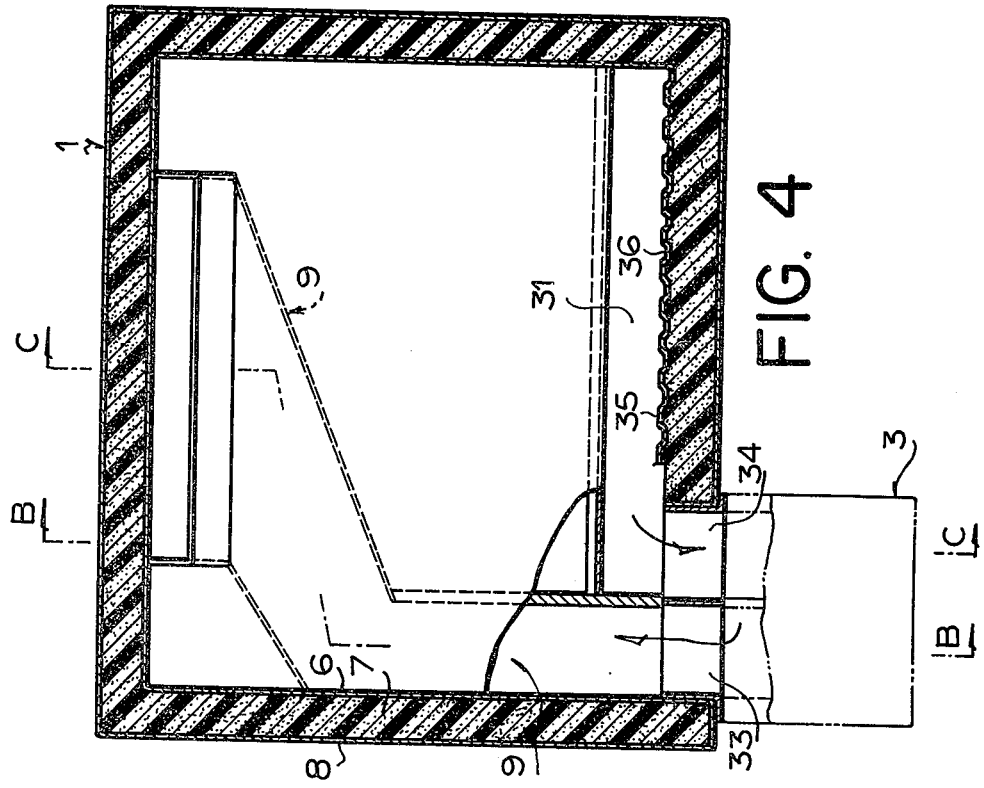
FIG. 4 is a vertical cross-section of a freezing container mounted on a chassis in another embodiment of this invention.

FIGS. 4 to 6 indicate a freezing container 1 modified from the first embodiment. The freezing container 1 includes a recess 31 formed at the inner portion thereof in a manner so as to be enlarged with the width of the container and to be limited near the floor by an end wall 32. Two parallel arranged joint ducts or mouth pieces 33 and 34 are disposed in the bore formed in the heat-insulator 7. Through the joint duct 33, the cooling duct 9 is communicated with the outlet of the cooling air conduit 10, and through the joint duct 34, the recess 31 is communicated with the inlet of the cooling air conduit 10. The mouth pieces 33 and 34 may be made of heat insulator materials such as plastics reinforced by glass fibers.

In order to satisfy the cooling air circulation, even if the load materials to be frozen are full in the space of the container, the floor plate 35 may be corrugated to form, under the floor surface, a plurality of parallel grooves 36 extending to the recess 31 so that the air flows between the materials through the grooves to the recess.

Figure 7:
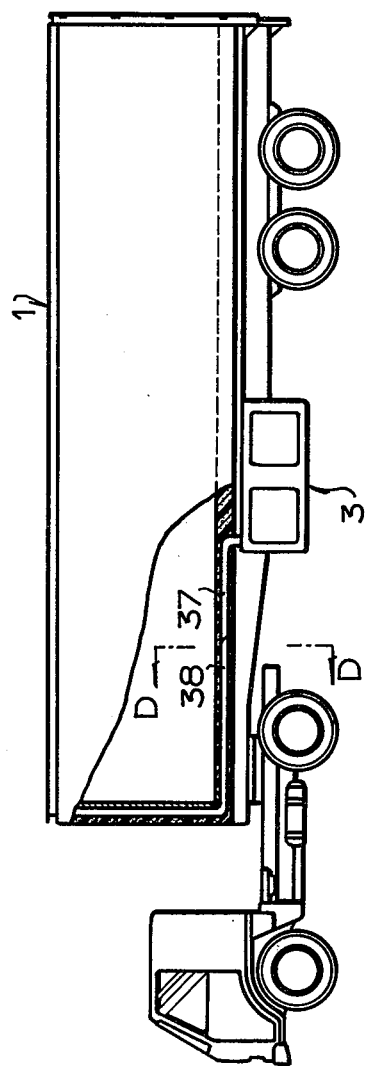
FIG. 7 is a side view of a refrigerator car of a trailer type further embodying the present invention, partly broken away.
Figure 8:
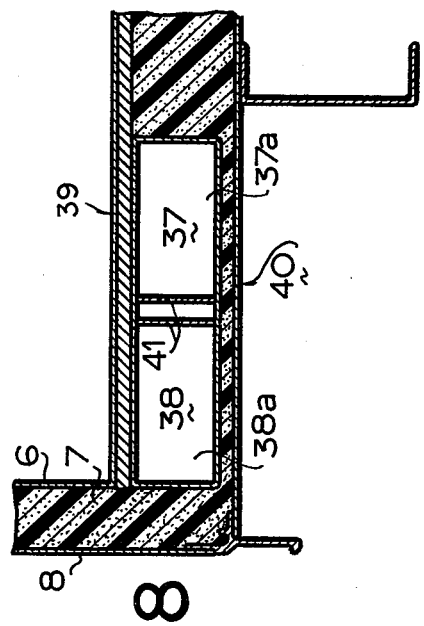
FIG. 8 is a cross-section of a freezing container included in the trailer, cut off along a line D — D of FIG. 7.

FIGS. 7 and 8 indicate a refrigerator car of a trailer type still further embodying the present invention and specially including two ducts 37 and 38 which run under the floor plate 39 of the freezing container 1 and extend above the refrigeration unit 3 so as to communicate with the inlet and outlet of the cooling air path 10 respectively. The duct 37, unless it communicates with a recess 31 (e.g., as shown in FIG. 4), may directly open, near the floor, into the interior of the container 1, and the duct 38 passes through the cooling duct 9. The ducts 37 and 38 are preferably positioned in the heat insulation layer, and may be replaced by a large duct 40 divided into two lines 37a and 38a by partition walls 41 mutually spaced as shown in FIG. 8.

The ducts 37 and 38, unless the heat insulation layer has a sufficient thickness to insert the ducts into the layer, or otherwise, should be disposed under the freezing container 1 as shown in FIG. 9. In this case, the inlet and outlet of the cooling air conduit 10 should open in front of the refrigeration unit 3; and at the forward end, the ducts 37 and 38 should communicate with the recess 31 and the cooling duct 9, respectively (the conduit 10, recess 31 and duct 9, not being shown in FIG. 9).

In order to commonly use the refrigeration unit 3 in both the refrigerator cars of the truck type, as shown in FIGS. 1 to 6, and of the trailer type, as shown in FIGS. 7 to 10, the cooling air conduit should include two sets of inlet and outlet, either of which are shut by detachable lids.

While we have disclosed several embodiments of the present invention, it is to be understood that these embodiments are given by example only and not in a limiting sense.

We claim:

1. In a refrigerator car having a chassis, the combination comprising
   a freezing container mounted on said chassis and having a floor, a ceiling and a cooling duct opening near said ceiling thereof;
   a refrigeration unit mounted on said chassis under said floor of said freezing container, said refrigeration unit including a cooling air conduit having an inlet communicating with said freezing container and an outlet communicating with said cooling duct;
   a power unit mounted on said chassis under said floor of said freezing container and transversely spaced from said refrigeration unit; and
   means for transmitting power from said power unit to said refrigeration unit,
   said freezing container includes a heat-insulator wall formed with a bore,
   parallel arranged joint ducts disposed in said bore, and
   one of said joint ducts communicates said cooling duct with the outlet of said cooling air conduit and another of said joint ducts communicates said freezing container with said inlet of said cooling air conduit.

2. In a refrigerator car having a chassis, the combination comprising:
   a freezing container mounted on said chassis and having a floor, a ceiling and a cooling duct opening near said ceiling thereof;
   a refrigeration unit mounted on said chassis under said floor of said freezing container, said refrigeration unit including a cooling air conduit having an inlet communicating with said freezing container and an outlet communicating with said cooling duct;
   a power unit mounted on said chassis under said floor of said freezing container and transversely spaced from said refrigeration unit; and
   means for transmitting power from said power unit to said refrigeration unit, said power transmitting means including a propeller shaft, universal coupling means for connecting said propeller shaft to said power unit and said refrigeration unit, said propeller shaft including a telescopical assembly constituting a rod and a tubular member splined to a free end portion of said rod.

3. The combination according to claim 2, in which said freezing container includes a bottom wall, and said inlet and said outlet of said cooling air conduit communicate with said freezing container and said cooling duct at said bottom wall of said freezing container, respectively.

4. The combination according to claim 3, in which said cooling duct forms an outlet substantially equal in size to the width of said container, and said freezing container so forms a recess therein for inducing cooling air into said inlet of said cooling air conduit.

5. The combination according to claim 4, in which said recess is formed near the floor of said freezing container.

6. The combination according to claim 5, in which said freezing container includes a heat insulator wall formed with a bore, and parallel arranged joint ducts disposed in said bore, one of said joint ducts communicating with said cooling duct and said outlet of said cooling air conduit, and another of said joint ducts communicating with said recess and said inlet of said cooling air conduit.

7. The combination according to claim 4, in which said freezing container includes a heat insulator wall, and ducts disposed in said heat insulator wall and extending below said floor of said freezing container, one of said ducts communicates with said recess and another of said ducts communicates with said cooling duct.

* * * * *